No. 746,698. PATENTED DEC. 15, 1903.
T. HANRAHAN.
WAGON ATTACHMENT.
APPLICATION FILED FEB. 21, 1902.
NO MODEL.
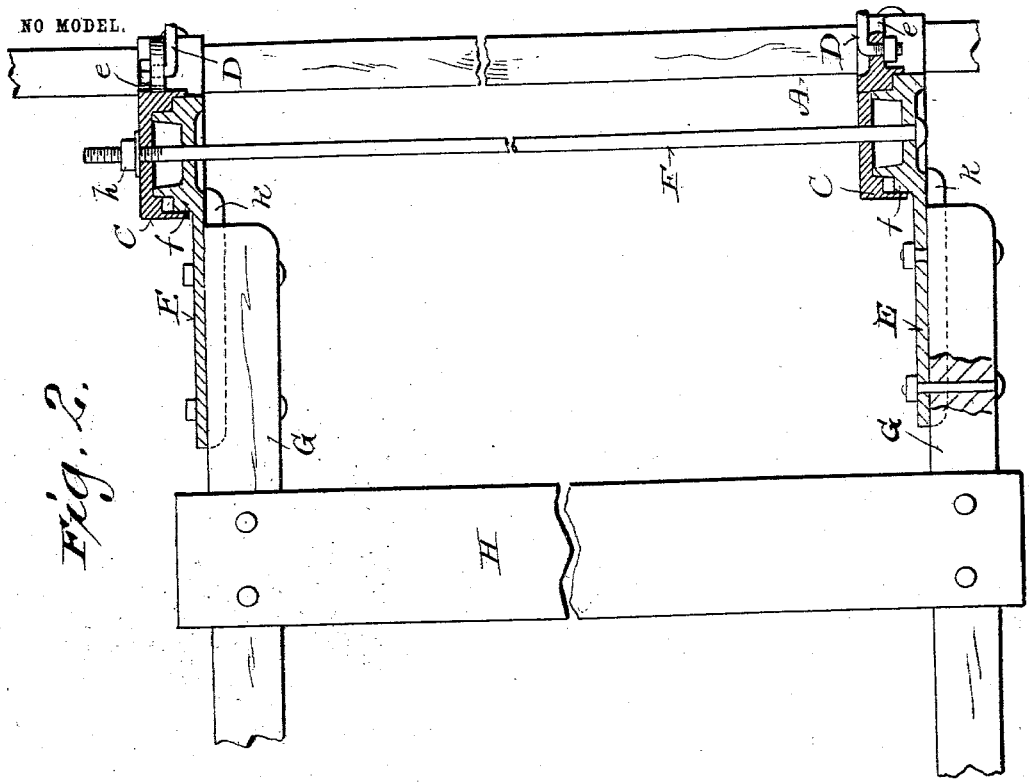
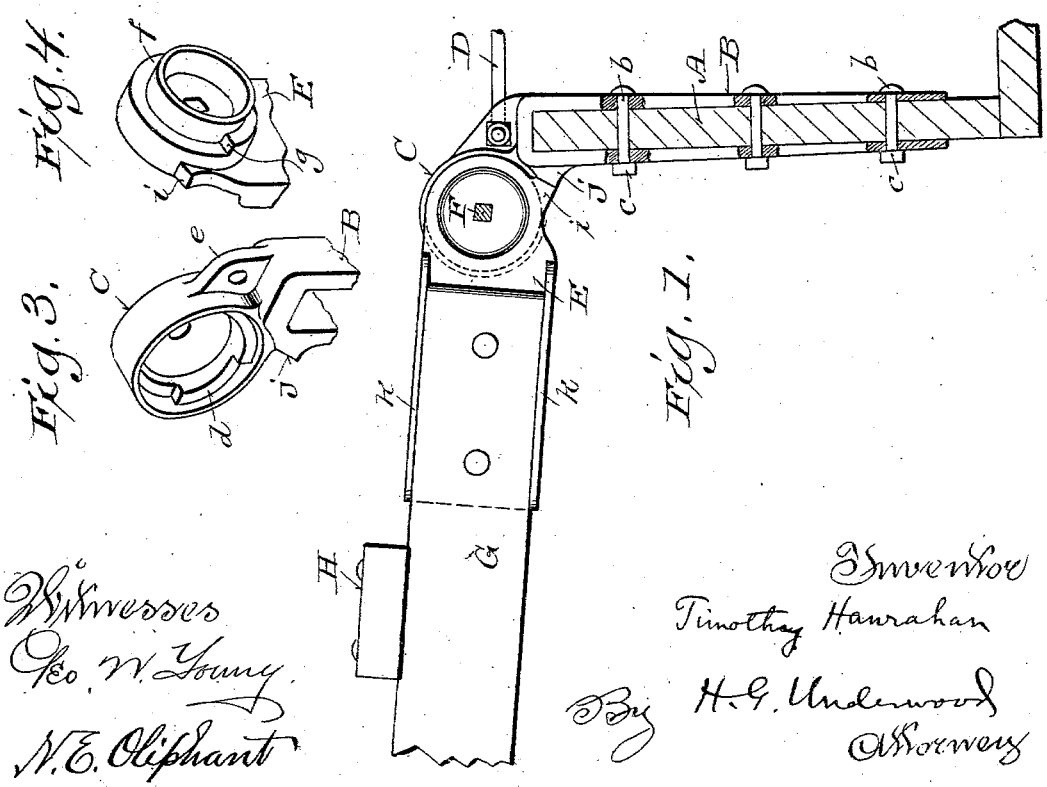

No. 746,698.

Patented December 15, 1903.

UNITED STATES PATENT OFFICE.

TIMOTHY HANRAHAN, OF IVESGROVE, WISCONSIN.

WAGON ATTACHMENT.

SPECIFICATION forming part of Letters Patent No. 746,698, dated December 15, 1903.

Application filed February 21, 1902. Serial No. 95,064. (No model.)

*To all whom it may concern:*

Be it known that I, TIMOTHY HANRAHAN, a citizen of the United States, and a resident of Ivesgrove, in the county of Racine and State of Wisconsin, have invented certain new and useful Improvements in Wagon Attachments; and I do hereby declare that the following is a full, clear, and exact description thereof.

The improvements consist in simple economical wagon-box attachments hereinafter particularly set forth with reference to the accompanying drawings and subsequently claimed, the object of the invention being to provide an ordinary farm-wagon with detachable and readily-adjustable side racks whereby the vehicle may be utilized to haul forage of various kinds or small live stock, such as sheep, hogs, and calves.

Figure 1 of the drawings represents a vertical transverse section view of a portion of a wagon-box and illustrates part of an adjustable side rack in detachable connection with said box by means in accordance with my invention; Fig. 2, a plan view, partly in section, of what is shown in the first figure; and Figs. 3 and 4 perspective views of the joint ends of a bracket and an arm constituting parts of one of my wagon-box attachments.

Referring by letter to the drawings, A indicates a side of an ordinary wagon-box. Straddling the wagon-box side at intervals of its length are bifurcated shanks B of brackets having upper annular heads C, outwardly offset from the shanks, the shank branches being shown provided with apertures for the engagement of bolts $b$, that also engage apertures provided in said wagon-box side, as is shown in Fig. 1, clamp-nuts $c$ being run on ends of the bolts. However, it is practical to provide for securing the brackets to the bottom of the wagon-box.

Each bracket-head is a shell having an inner two-tooth ratchet-track $d$, the faces of the respective teeth being on approximately vertical and horizontal planes that intersect central of said head. One of the teeth is in the lower portion of the bracket-head and the other in the outermost portion of said head, as is clearly shown in Fig. 3.

An inner strengthening-web $e$ between each bracket-shank and head is provided with an aperture for engagement of a right-angle end of a tie-rod D, this rod being utilized in connection with opposite brackets to brace the wagon-box when the side racks, hereinafter specified in detail, are adjusted in connection with the brackets to be utilized with said box as a carrier for hay or other forage.

Made to have match fit in each bracket-head C is an annularly-shouldered lateral protuberance $f$ at one end of an arm E, this protuberance being provided with an inclined single tooth $g$, that engages with ratchet-track $d$ in said bracket-head to abut one or the other of its teeth, the arm being then in either approximately horizontal or vertical position. A rod F is shown engaging all the bracket-heads and arms therewith at one side of the wagon-box. A nut $h$ is shown run on a screw-threaded end of the rod against a bracket-head, and the other end of said rod is headed to oppose an adjacent one of the adjustable arms. However, a separate pivot-bolt and nut thereon may be used with each bracket-head and arm therewith, the rods or bolts and the nut or nuts serving to held the arms in adjusted position.

A lug $i$ of each arm E abuts a lug $j$ under the head of the corresponding bracket when said arm is approximately horizontal, and the strains that would otherwise come upon teeth of said arm and bracket are diverted to the bracket-shank.

The brackets and arms above specified are of suitable metal, and in practice wooden beams G are bolted or otherwise rigidly secured to said arms between longitudinal flanges $k$ of the same. The beams are connected by boards H made fast thereon.

The side racks, each comprising arms, beams, and boards similar to those aforesaid, are connected to brackets of the kind above specified, made fast to the sides of the box of an ordinary farm-wagon, and said racks being adjusted to approximately horizontal position the wagon may be used for hauling hay or other forage. To use the wagon for hauling small live stock, the side racks are adjusted to vertical position and suitable provision had for fencing between the ends of said racks above the wagon-body.

It is intended that the brackets shall remain in connection with the sides of a wagon-body, to which they are fastened, the side racks being put in or out of working position at will.

The metal-work herein set forth is furnished to the trade, and the woodwork necessary to complete the side racks is such as can be readily made and connected by the average farmer with ordinary tools.

Having thus described my invention, what I claim as new, and desire to secure by Letters Patent, is—

1. A pair of brackets having shanks attachable to a side of a wagon-body, the upper end of each bracket being a laterally-offset annular shell containing a two-tooth ratchet-track $d$, the faces of the teeth being on approximately vertical and horizontal planes intersecting central of said shell, and arms E each having a shell fitting annularly-shouldered lateral protuberance $f$ provided with an inclined single tooth $g$ that engages with the ratchet-track in the corresponding shell against one or the other of the teeth therein, the arm being then either vertical or horizontal, means for holding the arms in adjusted connection with the brackets, beams fastened to the arms, and boards connected to the beams.

2. A pair of brackets having shanks attachable to a side of a wagon-body, the upper end of each bracket being a laterally-offset annular shell containing a two-tooth ratchet-track $d$, the faces of the teeth being on approximately vertical and horizontal planes intersecting central of the shell, a lug $j$ on each bracket under each bracket-head, arms E each having a shell fitting annularly-shouldered lateral protuberance $f$ provided with an inclined single tooth $g$ that engages with the ratchet-track in the corresponding shell against one or the other of the teeth therein, the arm being then vertical and horizontal, a lug $i$ on each arm in the path of a bracket-lug $j$, means for holding the arms in adjusted connection with the brackets, beams fastened to the arms, and boards connected to the beams.

3. A pair of brackets having shanks attachable to a side of a wagon-body, the upper end of each being a laterally-offset annular shell containing a two-tooth ratchet-track $d$, the faces of the teeth being on approximately vertical and horizontal planes, an apertured web between the head and shank of each bracket for the engagement of a tie-rod, arms E each having a shell fitting annularly-shouldered lateral protuberance $f$ provided with an inclined single tooth $g$ that engages with the ratchet-track in the corresponding shell against one or the other of the teeth therein, the arm being then either vertical or horizontal, means for holding the arms in adjusted connection with the brackets, beams fastened to the arms, and boards connected to the beams.

In testimony that I claim the foregoing I have hereunto set my hand, at Racine, in the county of Racine and State of Wisconsin, in the presence of two witnesses.

TIMOTHY HANRAHAN.

Witnesses:
BYRON F. BLISH,
ROY AVARD.